US006142338A

United States Patent [19]

Pellicano

[11] Patent Number: 6,142,338

[45] Date of Patent: Nov. 7, 2000

[54] FOAMER AND PROCESS FOR DISPENSING NON-AEROSOL FLUORIDE FOAM

[76] Inventor: Joseph J. Pellicano, 1410 222 Pl. NE., Redmond, Wash. 98053

[21] Appl. No.: 09/212,930

[22] Filed: Dec. 16, 1998

[51] Int. Cl.[7] .......... G01F 11/00

[52] U.S. Cl. .......... 222/1; 222/190; 222/321.7

[58] Field of Search .......... 222/1, 189.1, 189.11, 222/190, 321.7, 321.9

[56] References Cited

U.S. PATENT DOCUMENTS

| | | | |
|---|---|---|---|
| 4,770,634 | 9/1988 | Pellico | 433/217.1 |
| 4,932,567 | 6/1990 | Tanabe et al. | 222/190 |
| 5,156,307 | 10/1992 | Callahan et al. | 222/190 |
| 5,255,851 | 10/1993 | Tobler | 222/190 |
| 5,271,530 | 12/1993 | Uehira et al. | 222/190 |
| 5,462,208 | 10/1995 | Stahley et al. | 222/190 |

*Primary Examiner*—Joseph A. Kaufman

[57] ABSTRACT

A foamer for producing and dispensing fluoride-containing dental foam for prevention of cavities in teeth. The foamer incorporates a method for controlling flow of air into the solution and the foamer internal parts to limit contact of solution with the foamer parts.

3 Claims, 1 Drawing Sheet

FOAMER AND PROCESS FOR DISPENSING NON-AEROSOL FLUORIDE FOAM

FIELD OF THE INVENTION

This invention pertains to apparatus and processes for producing fluoride foams, particularly to fluoride foams for protection of teeth, and with still greater particularity to foamers and processes for dispensing such foams that do not require the use of pressure containers and propellants.

BACKGROUND OF THE INVENTION

For many years it has been known that exposure of child or adult teeth to the fluoride ion provides resistance to later decay. A number of methods of furnishing fluoride ion to teeth exist.

Fluorides have been found effective when ingested. This fact has led to the wide scale fluoridation of public water supplies. In fluoridation sodium fluoride or fluorosilic acid is commonly used. The concentration of fluoride ion in public water is generally limited to one part per million. In areas where fluoridated public water is unavailable sodium fluoride solution is available by prescription.

In addition to direct ingestion, topical exposure of developing, existing, and mature teeth to fluoride has been used. There have been continuing efforts to include fluoride in toothpaste. A major problem with such formulations is the incompatibility of the fluoride with abrasives (commonly some form of silicon dioxide). Sodium fluoride is usually used as the source of fluoride ion. If the media is acidic i.e. pH<7 the fluoride ion will bond to silica removing it from availability to the teeth.

Stannous fluoride is sometimes used as a source of fluoride. This is due to the discovery that the stannous ion reacts with the naturally occurring phosphate in the teeth to form highly decay resistant stannous fluorophosphate.

Various fluoride rinses and gels have also been tried. The simplest method has been exposing the teeth in situ to a solution containing the fluoride ion. Such rinses commonly include water containing sodium fluoride, a flavoring agent, and a dye. The more effective stannous fluoride is not used because it is unstable in combination with water. The flavoring agent makes the solution palatable and the dye serves to distinguish the solution from water. This method has several disadvantages. First, the exposure of teeth to the non-viscous solution is brief in the most common use. Second the water solution cannot be pushed into the sulcus of the tooth where root caries develop. Third, such solutions cannot be brushed where brushing opens more sites on the teeth for bonding. This is because brushing agitates the tooth surface sweeping away microscopic debris. These factors reduce the effectiveness of rinses. As a consequence gels have beer designed which solve some of these problems but present other problems.

As an alternative to gels and rinses, foams have been proposed for use as a carrier of fluoride. The only one of these preparations to have found any commercial success is that proposed in U.S. Pat. No. 4,770,634 to Michael Pellico (Pellico). In Pellico there was provided a foamable fluoride composition comprising a water soluble dental fluoride in an amount to provide the composition with about 0.5 to about 5 wt % available fluoride; and an orally compatible and acid stable foaming agent in an amount from about 4 to about 20 wt %; and an orally compatible and acid stable foam-wall thickener in an amount from about 2 to about 20 wt. %; and an orally compatible acidifying agent in an amount to provide the composition with a pH from about 3.0 to about 4.5; and water to 100 wt %.

In accordance with Pellico there is provided a method for treating teeth with a fluoride foam which comprises: dispensing a pressurized and foamable fluoride composition from an aerosol container into the trough of a dental tray to form a fluoride foam within the trough, wherein the foamable fluoride composition has the above composition. The process is then completed by superimposing the trough of the dental tray and its fluoride foam content about and into engagement with the teeth to effect fluoride uptake by said teeth.

Attendants with the advantages of aerosol foam are disadvantages related to the use of aerosols. In addition to above components one must use a pressure container and a propellant in order to create the foam. Pressure containers are more expensive than non-pressurized containers and have higher manufacturing costs. Pressure containers can only be cylindrical, drastically limiting the choice of container shape. Aerosol containers by their very nature cannot be completely emptied or refilled, increasing waste. In addition, the propellant may be incompatible with some compositions. Chlorofluorocarbons are banned from use due to their ozone depletion effect. Some of the replacements proposed such as propane are flammable and others such as nitrous oxide may have physiological effects. Accordingly, there is a commercial need for a fluoride foam that is nonflowable and which requires substantially less fluoride in the tray to achieve the same fluoride uptake as a corresponding volume of fluoride gel without the disadvantages of aerosol foams.

Non-aerosol foamers have been tried to accomplish the above goals. One such foamer is described in U.S. Pat. No. 5,665,332. In all such foamers a problem arose due to the interaction of the fluoride ion, with the container, and foamer. The foams work well at first but lose favorable characteristics on storage. On several occasions noxious gases have been detected in the container. These problems have stopped the widespread adoption of non-aerosol foamers.

In order to dispense non-aerosol foam a special pump-valve or foamer is used. Such a valve commonly mixes air with a composition containing a foaming agent and an active ingredient such as sodium fluoride or hydrofluoric acid each time the activator is depressed. Unfortunately, the fluorides present react with many of the materials present in foamers especially in combination with air. The major problem that has arisen is that the foamer pump piston sticks in the downward position upon standing. Accordingly to date there has not been a commercially successful non-aerosol fluoride foam.

SUMMARY OF THE INVENTION

The invention fulfills each of the requirements listed above. First, the product provides a concentration of available fluoride that can be taken up by the teeth which meets or exceeds that of any commercially available product. Second, there is no appreciable loss of this concentration upon storage under typical warehouse conditions over a period of at least one year. Third, the foaming agent and other components do not react with the fluoride. Fourth, the foam presents an attractive appearance to consumers. Fifth, the viscosity is sufficient to retain the material in dental trays and the like. Sixth, the foam uses materials which are stable and easily commercially available. Seventh, the foam does not require the use of pressure containers or propellants. The foamer works over an extended period of time without sticking and failing.

The foam includes a water solution of fluoride, a foaming agent, a foam wall thickener, and a food grade acid. This is foamed with a modified foamer that injects air into the solution. The foamer is modified to prevent deterioration of the solution and foamer parts.

It would be anticipated that it is necessary to use propellants and pressure containers in order to produce stable foam having the desired properties. Surprisingly, this has been shown not to be the case. Extensive testing has led to development of solutions which do not require these components. As stated above the long-term storage of the invention discloses significant advantages over pressure foamed aerosol solutions. The solutions used in the invention may be foamed by use of foamers that mix air with the solution. The foamer uses external air from the operating environment. A special foamer is required to prevent the deterioration of solution and foamer component failure during use.

DETAILED DESCRIPTION OF THE INVENTION

Figure 1:
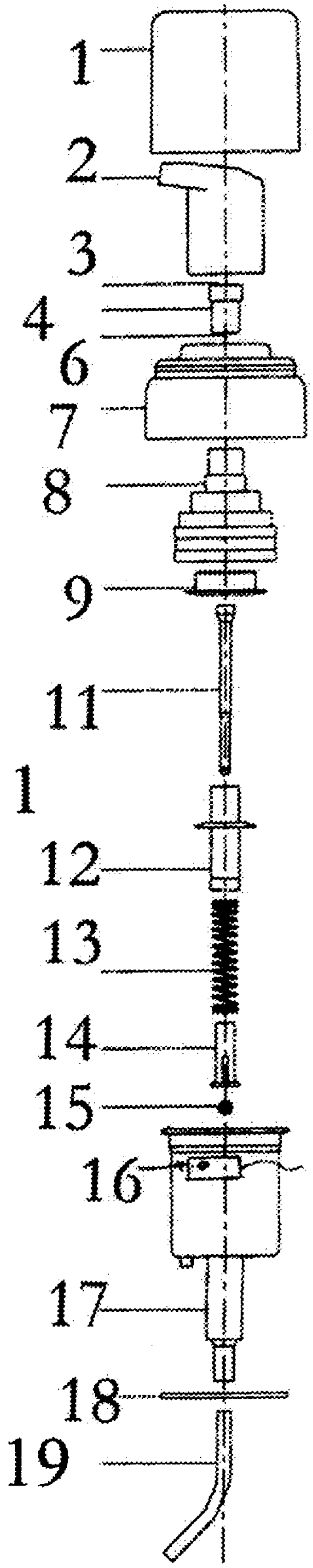
FIG. 1 is an exploded front elevation view of the foamer of the invention.

The product produced by the invention is a dental foam, i.e. an oral composition designed for use as a topical fluoride treatment and not as a dentifrice containing abrasive designed to clean teeth. This foam is normally recommended for use in addition to and not as a substitute for a dentifrice.

The invention relates to apparatus and methods for producing a foamed dental preparation containing fluoride ions ($F^-$) as an active ingredient that may be in the form of NaF or HF for example. Fluoride ions are available for use as an anti-caries topical treatment agent at a stable predictable level. All formulations of the invention incorporate air as a foaming agent.

In tests a modification of a commercially available hand operated foaming pump was used. This pump is manufactured by Airspray International BV oat Zuiderkade 31–33, P.O. Box 389, 1940 A J Beverwijk, The Netherlands as the F2 Pump Foamer. This pump is also the preferred method of practicing the invention at this time. This type of foamer completely empties the container and eliminates waste of solution. The container is refillable. It has been found that if such a foamer is used the initial performance is excellent. Upon storage however, the foamer sticks when the nozzle button is pushed. On some foamers the container filled with an unknown noxious substance. The inventor has theorized that air in combination with Hydrofluoric acid or fluoride ions has reacted with either components of the foamer or lubricants such as silicones present therein. Tests were conducted on modified foamers designed to limit the entry of air into the system. When the manufacturer was informed of these modifications the reply was that they would destroy the utility of the valve. The manufacturer refused to manufacture a valve with these characteristics. Tests have been conducted with other similar foamers with similar results all requiring modification as disclosed below.

FIG. 1 is an exploded front elevation view of the foamer of the invention. A protective cap 1 covers the top of the foamer when not in use. Cap 1 like all components unless otherwise noted is preferably constructed of an inert plastic such as polypropylene. A nozzle 2 includes an interior passage for the formed foam to flow through and emerge from. A netholder 4, preferably constructed of polyethylene tetraphtalate, is a hollow cylinder which holds two meshes 3 and 6 at either end. It is inserted into the interior passage of nozzle 2. Components 1–6 are attached to and are contained within a basecap 7. Basecap 7 is preferably constructed of polypropylene and further includes internal threads for attachment to a container (not shown). The container may be of any shape. A gasket 18 intercedes between basecap 7 and the container. A pump cylinder 17 attaches to the bottom surface of base cap 7. Cylinder 17 preferably constructed of polypropylene includes a vent hole 16 for admission of air. The manufacturer of the foamer contends that vent hole 16 is necessary to prevent collapse of the container. In use the inventor has found that vent hole 16 must be sealed with tape 20 or a sealant (not shown) to prevent the unwanted introduction of solution and/or saturated vapors into the interior of pump cylinder 17. An air piston 8 is located within cylinder 17 with its outer surface forming a substantially airtight seal against the upper portion of cylinder 17. The upper surface of air piston 8 includes a hole adapted to receive netholder 4, and also contacts nozzle 2. Air piston 8 is forced downward into cylinder 17 when nozzle 2 is depressed. The hole on the top of piston 8 includes a constriction that opens into a hollow channel allowing passage of air and liquid. A valve 9 preferably of low-density polyethylene fits into a recess on the bottom surface of piston 8 allowing one way passage of air into cylinder 17 from three channels between the top and bottom surfaces of piston 8 along its outer circumference. Valve 9 also allows one way passage of air out of cylinder 17 around its inner circumference, which surrounds the upper portion of a liquid piston 12. An inner rod 11 also passes through the hollow interior of piston 8 passing through liquid piston 12 and a spring 13 preferably of stainless steel. The upper portion of rod 11 is enlarged allowing it to act as a valve which opens allowing passage of liquid when piston 12 moves downward. Rod 11 rests in a hole on the top of a plug 14 and is molded from plastic, preferably polypropylene. Plug 14 includes an interior passage plugged by rod 11, which vents to its outer surface and holds a stainless steel ball 15 within the lower constricted section of cylinder 17. Plug 14 fits within spring 13 and limits downward motion of liquid piston 12. Finally a dip tube of polyethylene 19 connects to a hole in the bottom of the constricted section of cylinder 17.

In operation the user pushes down nozzle 2. This motion is conveyed through netholder 4 to pistons 8 and 12 in cylinder 17. This action compresses spring 13 between plug 14 and cylinder 12. When pressure on nozzle 2 is released spring 13 pushes pistons 12 and 8 upwards. The upward movement of piston 12 causes liquid in the container to flow up tube 19 into the constricted section of cylinder 17.

Nozzle 2 is now depressed a second time. This action closes ball 15 against the inlet of cylinder 17. The downward movement of piston 12 forces liquid to flow upwards in the interior of piston 12 toward netholder 4. Similarly air is forced by the downward movement of air piston 8 through the interior of piston 8 and netholder 4. The mixture of air and liquid hits the constriction in the interior of piston 8 then flows into the interior of netholder 4 where it expands into foam. The foam flows through the interior of nozzle 2 and emerges from nozzle 2. The process repeats itself as many times as the nozzle is depressed after the first or priming stroke. On each cycle liquid is withdrawn from the container and mixed with air from the outside environment before emerging as foam.

As regards vent hole 16 the following is apparent; if vent hole 16 is open air from the interior of the container is drawn into cylinder 17 on the downstroke of air piston 8 because hole 16 opened onto the center of the outside circumference of air piston 8. This air is saturated with whatever volatiles are present in the interior of the container. Similarly air from the exterior of the container is drawn into the container through passage 16 upon the upstroke of liquid piston 12 due to the partial vacuum created in the container. The effect is to circulate air from the outside environment through the container each time the pump is cycled. If however hole 16 is sealed air comes into the interior of cylinder 17 entirely from the outside environment. It is postulated that the saturated air adversely reacts with the interior components of the valve or lubricants present therein. This causes a deterioration of performance of the foamer. It also appears that under conditions of use a portion of solution enters the interior of cylinder 17 from vent hole 16. Air piston 8 sticks in the downward position the next time nozzle 2 is pushed and will no longer freely move. It is postulated that a foamer could also be made without vent hole 16. In such a case an alternative method of letting air into the container must be found to prevent collapse of the container as liquid is withdrawn.

To test the valve a formulation was made in a 1000 g. test batch using: 777.5 g of water, 100 g of Block copolymer of Ethylene Oxide Propylene Oxide Nonionic Surfactant, 50 g. of glycerin, 10 g. Cocamidopropyl Betaine, 9.5 g. Hydrofluoric Acid (HF), 18.5 g. Sodium Fluoride (NaF), 14 g. Sodium Phosphate Monobasic $NaH_2PO_4$, 7 g. of Non-nutritive artificial sweetener and 13.5 g. of flavoring. This formulation was found to best optimize the objectives of the invention and demonstrate the use of hydrofluoric acid as a fluoridating agent in a foamable solution.

When this formulation was placed in the container and the valve used with vent hole 16 open the initial performance was excellent. Upon standing however, problems began. The first problem was that the solution lost the ability to form foam of good characteristics. The second problem was that piston 8 stuck in the downward position. In one case an offending odor was noticed in those cases where a silicone based surfactant was used in the foamer.

To test the hypotheses vent hole 16 was sealed with tape in 20 containers. Initial performance, of the foamer and foam was excellent in 16 of the containers. In the remaining 4 containers the sides of the container were seen to collapse. To remedy this problem gasket 18 was removed and the container reassembled. The containers did not collapse. Upon standing the containers were retested and foam characteristics were found to be excellent on all containers tested. It is not readily apparent exactly why the sealing of passage 16 acts in the manner it does; the tests are however, repeatable. The above examples are exemplary only. In no case did piston 8 stick. The invention is defined solely by the attached claims.

I claim:

1. A method for preventing jamming of a nonaerosol foamer for use with a dental fluoride solution for use in molding a chloride foam which includes an air piston movable within an air cylinder having a passage through the outer cylinder wall allowing contact between the solution and the air piston and the interior of the air cylinder concentric with a liquid piston movable within a liquid cylinder the method comprising: the step of limiting contact of components of said fluoride solution with sources of said air piston and air cylinder and the first step comprising the step of permanently covering said passage.

2. A method as in claim 1, wherein said covering step is accomplished by the covering of said passage through said air cylinder with plastic tape to prevent contact of said solution to said air piston.

3. A method as in claim 1, wherein said covering step is accomplished by the covering of said passage through said air cylinder with a sealant to prevent contact of said solution to said air piston.

* * * * *